US010677392B2

(12) United States Patent
Monti et al.

(10) Patent No.: US 10,677,392 B2
(45) Date of Patent: Jun. 9, 2020

(54) CONTROL SYSTEM AND METHOD FOR PRESSURE-LET-DOWNS STATIONS (71) Applicant: Nuovo Pignone Tecnologie Srl, Florence (IT)

(72) Inventors: Francesca Monti, Florence (IT); Simone Amidei, Florence (IT)

(73) Assignee: NUOVO PIGNONE SRL, Florence (IT)

( * ) Notice: Subject to any disclaimer, the term of this patent is extended or adjusted under 35 U.S.C. 154(b) by 0 days.

(21) Appl. No.: 15/780,731

(22) PCT Filed: Dec. 1, 2016

(86) PCT No.: PCT/EP2016/079422
§ 371 (c)(1),
(2) Date: Jun. 1, 2018

(87) PCT Pub. No.: WO2017/093396
PCT Pub. Date: Jun. 8, 2017

(65) Prior Publication Data
US 2018/0356044 A1 Dec. 13, 2018

(30) Foreign Application Priority Data
Dec. 2, 2015 (IT) .................... 102015000079461

(51) Int. Cl.
*F17D 1/05* (2006.01)
*F17D 1/075* (2006.01)
(Continued)

(52) U.S. Cl.
CPC .............. *F17D 1/05* (2013.01); *F17D 1/075* (2013.01); *F16L 53/30* (2018.01); *F17C 13/10* (2013.01);
(Continued)

(58) Field of Classification Search
CPC .............. F17D 1/05; F17D 1/075; F16L 53/30
See application file for complete search history.

(56) References Cited

U.S. PATENT DOCUMENTS 3,820,590 A * 6/1974 Littman et al. ......... F28F 27/00
165/292
3,877,218 A * 4/1975 Nebgen ................... F02C 7/143
60/775
(Continued)

FOREIGN PATENT DOCUMENTS

EP 1 865 249 A2 12/2007
EP 2 264 288 A1 12/2010
(Continued)

OTHER PUBLICATIONS

Italian Search Report and Written Opinion issued in connection with corresponding IT Application No. 102015000079461 dated Sep. 1, 2016.
(Continued)

*Primary Examiner* — Mark A Laurenzi
*Assistant Examiner* — Shafiq Mian
(74) *Attorney, Agent, or Firm* — Baker Hughes Patent Organization (57) ABSTRACT

A system for depressurizing a gas in a pipeline is described. The system com-prises an expander configured and arranged for generating mechanical power by expanding gas from a first pressure to a second pressure. The system further comprises a heat pump and a heat transfer circuit containing a heat transfer fluid circu-lating therein, for receiving heat from the heat pump and delivering heat to the gas through a heat exchanger. A controller is further provided, configured and arranged for modulating a flow rate of the heat transfer fluid circulating in the heat transfer circuit as a function of a heat rate to be transferred from the heat transfer fluid to the gas, particularly as a function of temperature differentials
(Continued)

between the gas and the heat transfer fluid at a gas inlet side and a gas outlet side of the heat exchang-er.

16 Claims, 3 Drawing Sheets

(51) Int. Cl.
*F16L 53/30* (2018.01)
*F17C 13/10* (2006.01)

(52) U.S. Cl.
CPC .. *F17C 2221/032* (2013.01); *F17C 2221/033* (2013.01); *F17C 2223/0123* (2013.01); *F17C 2223/035* (2013.01); *F17C 2225/0123* (2013.01); *F17C 2225/033* (2013.01); *F17C 2225/035* (2013.01); *F17C 2227/039* (2013.01); *F17C 2227/0309* (2013.01); *F17C 2227/0316* (2013.01); *F17C 2227/0323* (2013.01); *F17C 2250/043* (2013.01); *F17C 2250/0439* (2013.01); *F17C 2250/0626* (2013.01); *F17C 2250/0631* (2013.01); *F17C 2250/0636* (2013.01); *F17C 2265/068* (2013.01); *F17C 2265/07* (2013.01)

(56) References Cited

U.S. PATENT DOCUMENTS

| | | | | |
|---|---|---|---|---|
| 4,061,185 | A * | 12/1977 | Faiczak | F24D 11/003 165/48.1 |
| 4,265,223 | A * | 5/1981 | Miserlis | F22B 1/006 126/592 |
| 5,395,451 | A * | 3/1995 | Triculis | B05B 9/002 118/602 |
| 5,904,292 | A * | 5/1999 | McIntosh | G05D 23/1393 165/295 |
| 2003/0227732 | A1 * | 12/2003 | Dessiatoun | H01L 23/427 361/103 |
| 2004/0208806 | A1 * | 10/2004 | Ashe | B01J 19/0013 422/200 |
| 2005/0002831 | A1 * | 1/2005 | Ashe | F16K 11/07 422/106 |
| 2006/0020420 | A1 | 1/2006 | Vesel | |
| 2007/0214806 | A1 | 9/2007 | Faka | |
| 2007/0283705 | A1 * | 12/2007 | Taylor | F17D 1/05 62/88 |
| 2010/0287964 | A1 * | 11/2010 | Okamoto | F24D 11/0214 62/224 |
| 2010/0314074 | A1 * | 12/2010 | Sikora | F02C 1/02 165/104.11 |
| 2011/0305556 | A1 * | 12/2011 | Asti | F01D 17/165 415/1 |
| 2016/0214465 | A1 * | 7/2016 | Zhou | F01K 23/065 |
| 2017/0219219 | A1 * | 8/2017 | Miller | F24D 3/02 |

FOREIGN PATENT DOCUMENTS

| | | |
|---|---|---|
| EP | 2 390 470 A1 | 11/2011 |
| RU | 14603 U1 | 8/2000 |
| RU | 2565679 C2 | 10/2015 |
| SU | 353387 A1 | 8/1982 |

OTHER PUBLICATIONS

International Search Report and Written Opinion issued in connection with corresponding PCT Application No. PCT/EP2016/079422 dated Mar. 1, 2017.

International Preliminary Report on Patentability issued in connection with corresponding PCT Application No. PCT/EP2016/079422 dated Jun. 5, 2018.

Russian Search Report issued in connection with corresponding RU Application No. 2018119231, dated Mar. 2, 2020.

* cited by examiner

CONTROL SYSTEM AND METHOD FOR PRESSURE-LET-DOWNS STATIONS

TECHNICAL FIELD

The disclosure relates to gas transportation. More specifically, the disclosure relates to so-called pressure-let-down stations, where a pressurized gas is de-pressurized for distribution in a distribution grid, at a lower pressure. Embodiments disclosed herein relate to systems and methods for providing efficient depressurization of the gas and at least partial recovery of the pressure energy.

BACKGROUND

Gas is one of the primary sources of energy used for both domestic as well as industrial uses. Natural gas, usually comprised of a mixture of hydrocarbons, is transported through transportation pipelines over long distances and then distributed in distribution networks or grids.

Gas is transported in the transportation pipelines at relatively high pressure, for instance in the range of 55-65 bar. In a distribution network, where through gas is distributed to final users, gas is present at a substantially lower pressure, e.g. in the range of 6-24 bar, depending upon local legislation. Pressure-let-down stations are used, wherein gas flows from the transportation pipeline towards the distribution network while the pressure of the gas is reduced as required.

In commonly used pressure-let-down stations the gas is caused to expand in pressure control valves, also called Joule Thomson (JT) valves. The entire energy associated to the pressure is dissipated in the pressure control valve. During decompression the gas cools down due to the Joule-Thomson effect. The heavier hydrocarbons present in the gas can condensate if too a low gas temperature is achieved at the end of the decompression process. In order to prevent condensation and/or formation of hydrates, a minimum admissible temperature at the inlet of the distribution network is usually set by legislation. The minimum temperature is usually around 0-5° C. Thus, before decompression, the gas is heated such that the final temperature thereof, after decompression, does not drop below the minimum admissible gas temperature at the inlet of the distribution network.

Compressed gas is usually heated by heat exchange against hot water, which is in turn produced in a boiler, where a portion of the gas transported in the distribution network is burned to generate heat. Depressurizing gas from a first, transportation pressure to a second, distribution pressure, lower than the transportation pressure, is thus an energy-consuming process due to two factors: on the one hand the pressure energy present in the gas is dissipated. On the other hand, a certain amount of gas must be consumed just for the purpose of heating the high-pressure gas to prevent the temperature of the low-pressure gas to drop below the minimum admissible gas temperature.

Attempts have been made to make the depressurization process less energy-consuming, by recovering the pressure energy from the gas. For this purpose, gas is expanded in a turboexpander, e.g. a radial turbine, which converts at least part of the pressure energy contained in the gas flow into mechanical power. The latter can then be exploited as such or converted into electric power by means of an electric generator.

However, the pressure drop being the same, an expansion process through a turboexpander, which generates mechanical power, causes a much higher temperature drop than a JT valve. This is simply corresponds to the fact that the gas transformation is not an adiabatic transformation, but becomes a quasi-isentropic transformation, during which power is extracted from the flow of expanding gas.

In order to meet the temperature requirements at the inlet of the gas distribution grid, therefore, more thermal power must be spent in order to heat the high-pressure gas at a temperature higher than that required if a simple JT valve is used for depressurizing purposes. Considering the revenue stream generated by the power generated by the expander versus the extra-amount of expenditure for heating, the resulting margin is so slim that it rarely justifies the higher investments required by complex machinery, as the turboexpander and electric generator.

U.S. Pat. No. 8,028,535 suggests using a transcritical heat pump as a source of heat for heating the gas in a gas depressurization system. The use of a transcritical heat pump can, under certain operating conditions, result in a more efficient depressurization system, in view of the high coefficient of performance which a transcritical heat pump can achieve when operating between the ambient temperature and the high temperature required to be achieved by the gas to be expanded in the depressurization system.

However, it turned out that depressurization systems using transcritical heat pumps may not be expedient under certain operating conditions, namely when the gas flow rate is reduced with respect to a design flow rate through the expander. It shall be noted that, due to the kind of use made of this source of energy, the gas flow rate has dramatic daily fluctuations, e.g. since at nighttime a much smaller amount of gas is required. Strong yearly fluctuations are also to be taken into account, due to larger consumption of gas during the cold season, as well as due to variations of gas consumption linked to variations in the industrial activity, which also can vary during the year.

Similar limitations and drawbacks are also encountered if a standard, i.e. non-transcritical, heat pump is used as a heating means for heating the pressurized gas prior to expansion in the expander.

A need therefore exist, for further improving the efficiency of pressure-let-down stations using expanders and heat pumps as sources of heat to increase the gas temperature.

SUMMARY OF THE INVENTION

According to a first aspect, disclosed herein is a system for depressurizing a gas in a pipeline, comprising an expander configured and arranged for generating mechanical power by expanding gas from a first, higher pressure to a second, lower pressure. The system further comprises a heat pump and a heat transfer circuit containing a heat transfer fluid circulating therein, for receiving heat from the heat pump and delivering heat to the gas through a heat exchanger. The system also comprises a controller, configured and arranged for modulating a flow rate of the heat transfer fluid circulating in the heat transfer circuit as a function of a heat rate to be transferred from the heat transfer fluid to the gas, particularly as a function of temperature differentials between the gas and the heat transfer fluid at a gas inlet side and a gas outlet side of the heat exchanger.

In some embodiments, the heat exchanger is arranged upstream of the expander with respect to a direction of flow of the gas in the pipeline. The gas is thus heated prior to expansion in the expander.

The heat pump can be a transcritical heat pump, e.g. a transcritical heat pump using carbon dioxide as a working fluid. A transcritical heat pump is such a heat pump wherein the working fluid is in a supercritical state in at least a portion of the working circuit.

According to some embodiments, the controller can be configured and arranged for modulating the flow rate of the heat transfer fluid as a function of temperature differentials between the gas and the heat transfer fluid at a gas inlet side and a gas outlet side of the heat exchanger, in order to set the flow rate of the heat transfer fluid such that the optimal coefficient of performance of the heat pump can be achieved.

According to a further aspect, disclosed herein is a method for depressurizing a gas in a pipeline, comprising the following steps:

delivering a gas through a heat exchanger and an expander;

expanding the gas from a first pressure to a second pressure in the expander and generating mechanical power therewith;

heating the gas in the heat exchanger by delivering thereto heat from a heat pump through a heat transfer fluid circulating in a heat transfer circuit and in heat exchange relationship with the gas and with a working fluid processed by the heat pump;

modulating a flow rate of the heat transfer fluid in the heat transfer circuit as a function of a heat rate to be transferred from the heat transfer fluid to the gas, particularly as a function of temperature differentials between the gas and the heat transfer fluid at a gas inlet side and a gas outlet side of the heat exchanger.

Features and embodiments are disclosed here below and are further set forth in the appended claims, which form an integral part of the present description. The above brief description sets forth features of the various embodiments of the present invention in order that the detailed description that follows may be better understood and in order that the present contributions to the art may be better appreciated. There are, of course, other features of the invention that will be described hereinafter and which will be set forth in the appended claims. In this respect, before explaining several embodiments of the invention in details, it is understood that the various embodiments of the invention are not limited in their application to the details of the construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which the disclosure is based, may readily be utilized as a basis for designing other structures, methods, and/or systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein.

DETAILED DESCRIPTION OF EMBODIMENTS

The following detailed description of exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Herein after a detailed description of an exemplary embodiment of a system according to the present disclosure is provided, which uses a transcritical heat pump. It shall however be understood that at least some of the features of the system and method disclosed herein can be used also in installations using a standard, i.e. non-transcritical, heat pump.

As used herein the term "transcritical heat pump" indicates a heat pump, in which a working fluid undergoes cyclic thermodynamic transformations and changes between supercritical and subcritical states.

Figure 1:
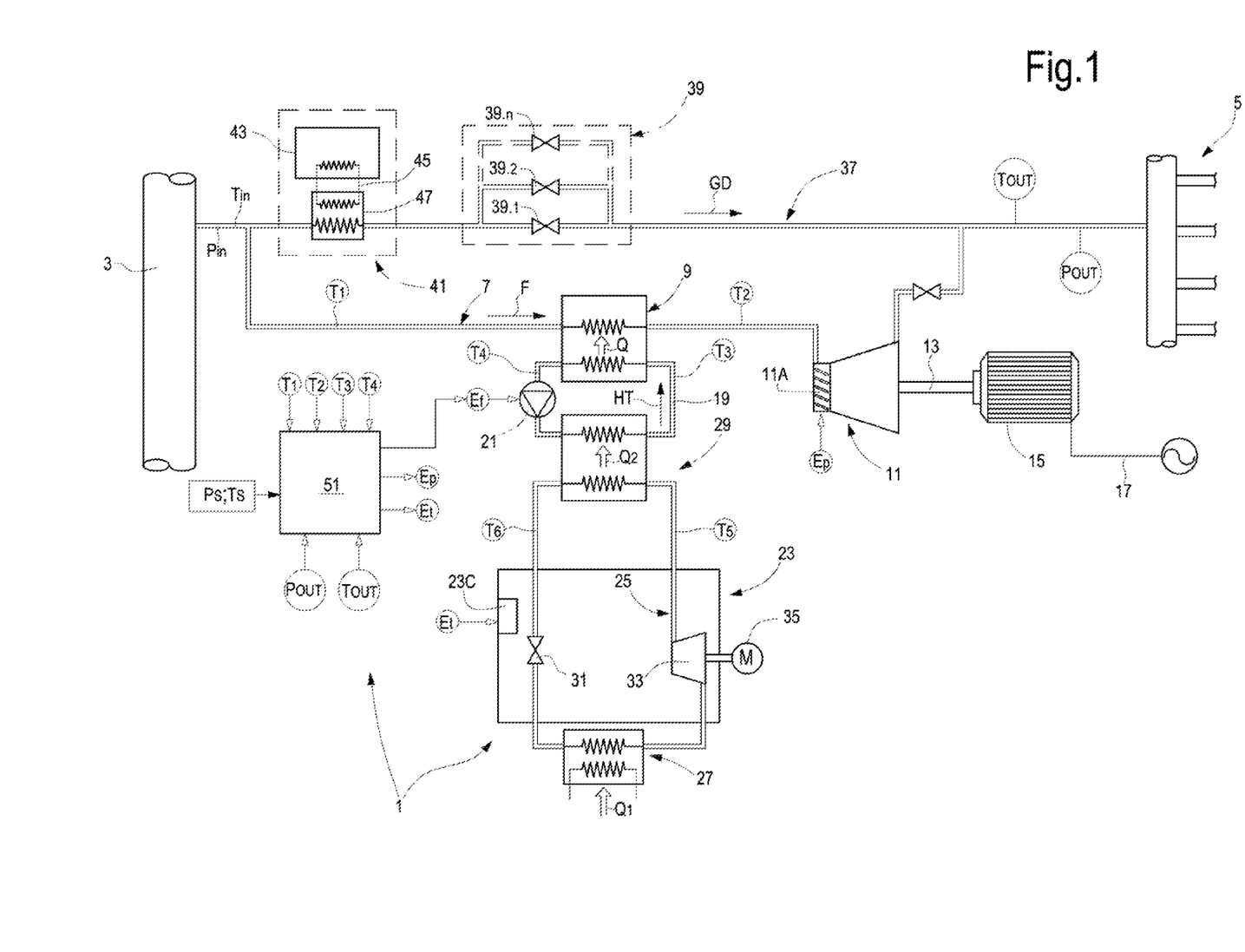
FIG. 1 illustrates a block diagram of an exemplary embodiment of a system according to the present disclosure.

A schematic of an exemplary embodiment of the system according to the present disclosure is shown in FIG. 1.

The system, globally labeled 1, is arranged between a high-pressure gas transportation pipeline 3 and a low-pressure gas distribution network 5. The system 1 comprises a pipeline 7, fluidly coupled to the high-pressure gas transportation pipeline 3. A heat exchanger 9 is arranged along the pipeline 7. The heat exchanger 9 can be a counter-flow heat exchanger.

An expander 11, for instance a radial turboexpander, is arranged downstream of the heat exchanger 9, with respect to the direction of flow (arrow F) of the gas in the pipeline 7. The inlet of the expander 11 is fluidly coupled to the outlet of the heat exchanger 9, while the outlet of the expander 11 is fluidly coupled to the low-pressure gas distribution network 5. The expander 11 can be provided with variable inlet guide vanes (IGVs) schematically shown at 11A, which can be controlled to adjust the gas flow rate through the expander 11, as will be described in greater detail later on. The expander 11 is designed to support a maximum flow rate therethrough and the variable IGVs 11A are used to adjust the flow rate from a minimum to said maximum flow rate, depending upon the demand for gas from the low-pressure gas distribution network 5.

The expander 11 is arranged and configured for expanding gas therein from a first, higher pressure upstream of the expander 11 to a second, lower pressure downstream of the expander 11. Work is generated through gas expansion and mechanical power is available on an expander shaft 13. In some embodiments, the mechanical power can be converted in electric power. For instance, as shown in FIG. 1, the expander shaft 13 can be mechanically coupled to an electric generator 15, which converts mechanical power generated by the expander 11 into electric power, which is delivered to an electric distribution grid 17 or directly to one or more electric loads (not shown).

The gas flowing through the heat exchanger 9 is in heat-exchange relationship with a heat transfer circuit 19, where through a heat transfer fluid is circulated, for instance by a pump 21. The heat transfer fluid can be a liquid, for instance water, or any other suitable fluid. Arrow HT represents the direction of flow of the heat transfer fluid in the heat transfer circuit 19. The heat transfer fluid in the heat transfer circuit 19 transfers heat to the gas flowing through the pipeline 7 and the heat exchanger 9. The heat transfer fluid is moreover in heat exchange relationship with a high-temperature side of a heat pump 23, wherefrom the heat transfer fluid receives heat. In the exemplary embodiment described herein the heat pump 23 is a transcritical heat pump.

The transcritical heat pump 23 is comprised of a working fluid circuit schematically shown at 25, wherein a working fluid undergoes cyclic thermodynamic transformations to extract heat from a low-temperature heat source, for instance air, water or the ground, and release heat at a higher temperature to the heat transfer fluid circulating in the heat transfer circuit 19. Reference number 27 schematically indicates the low-temperature heat exchanger of the transcritical heat pump 23, in heat-exchange relationship with the low-temperature heat source. Reference number 29 schematically indicates the high-temperature heat exchanger of the transcritical heat pump 23. An expansion valve 31 and a compressor or pump 33, driven by an electric motor 35, divide the working fluid circuit 25 in a low pressure side and a high pressure side.

The heat transfer circuit 19 interposed between the transcritical heat pump 23 and the heat exchanger 9 allows the heat exchanger 9 and the pipeline 7 to be arranged separately and at a distance from the transcritical heat pump 23.

High-pressure gas from the high-pressure gas transportation pipeline 3 enters the pipeline 7 at an inlet pressure $P_{in}$ and at an inlet temperature $T_{in}$. The inlet pressure $P_{in}$ depends upon the conditions of operation of the high-pressure gas transportation pipeline 3, while the inlet temperature $T_{in}$ depends inter alia upon environmental factors, since the high-pressure gas transportation pipeline 3 can be located in the ground, the temperature whereof can fluctuate depending upon environmental conditions.

At the inlet of the low-pressure gas distribution network 5, i.e. downstream of the expander 11, a substantially constant gas outlet pressure must be maintained. The system 1 is controlled such that the gas outlet pressure $P_{out}$ is maintained around a pressure set point Ps. In order to prevent condensation of gas components having a heavier molecular weight in the low-pressure gas distribution network 5, i.e. downstream of the expander 11, the gas temperature $T_{out}$ downstream of the expander 11 shall not drop below a minimum gas outlet temperature. The system 1 can be controlled such that the gas outlet temperature $T_{out}$ is maintained around a temperature set point Ts, or can be maintained above said temperature set point. Heat provided by the transcritical heat pump 23 increases the gas temperature prior to expansion in the expander 11, such that the gas outlet temperature $T_{out}$ can be maintained around the temperature set point Ts or above.

The temperature set point Ts can be around 0°-5° C., for example, or any other temperature value consistent with regulations applied in the country, where the system 1 is installed. Even though a temperature higher than the minimum temperature allowed by regulations could be used, in an embodiment the temperature set point Ts is in an embodiment set at the minimum allowable value, such that thermal power required to heat the gas prior to expansion is minimized. A temperature control loop can be provided to maintain the temperature $T_{out}$ around the temperature set point Ts.

In other embodiments, the temperature control loop could be omitted, and the temperature at the inlet of the expander 11 can be selected such that the temperature $T_{out}$ is always above a minimum temperature set point. This, however, would not be optimal from the point of view of energy saving. Indeed, if the expander operates at a reduced gas flow rate, i.e. at a flow rate below the design point, a reduced amount of electric power is generated, while an excess amount of thermal energy would be consumed for heating the gas prior to expansion, such that the ratio between electric power produced by expansion and electric power consumed for pre-heating the gas would drop below optimal.

According to some embodiments, the expander 11 is designed such that the maximum gas flow therethrough is lower than the maximum expected gas flow demand from the low-pressure gas distribution network 5. An auxiliary gas delivery duct can be provided to supply gas in excess of the maximum gas flow allowed through the expander 11. In the embodiment illustrated in FIG. 1, the circuit comprising the pipeline 7, the heat exchanger 9 and the expander 11 is arranged in parallel to a gas delivery duct 37 having an inlet fluidly coupled to the high-pressure gas transportation pipeline 3 and an outlet fluidly coupled to the low-pressure gas distribution network 5.

Along the gas delivery duct 37 a pressure control valve arrangement 39 and a heater arrangement 41 can be provided. The heater arrangement 41 can be arranged downstream of the pressure control valve arrangement. In other, embodiments, as shown in the drawing, the heater arrangement 41 is arranged upstream of the pressure control valve arrangement 39 with respect to the direction (arrow GD) of the gas flow through the gas delivery duct 37.

As will become apparent from the following description, under some operating conditions the pressure control valve arrangement 39 can be closed, such that no gas will flow through the gas delivery duct 37 and the entire gas flow demand from the low-pressure gas distribution network 5 will be supplied through pipeline 7. This specifically happens when the low-pressure gas distribution network 5 requires a gas flow rate which is equal to, or lower than the maximum design flow rate of the expander 11. Conversely, if a higher gas flow rate is demanded by the low-pressure gas distribution network 5, gas will flow also through the gas delivery duct 37.

The pressure control valve arrangement 39 can comprise one pressure control valve, or else a plurality of pressure control valves 39.1, 39.2, . . . 39.n arranged in parallel, as schematically shown in FIG. 1. Each pressure control valve 39.1, 39.2, . . . 39.n can be selectively opened or closed, depending upon the gas flow rate demand.

The heater arrangement 41 can be comprised of a heater 43, a secondary heat transfer circuit 45 and a heat exchanger 47. Heat generated in the heater 43, e.g. by burning gas supplied by the high-pressure gas transportation pipeline 3, is transferred through the secondary heat transfer circuit 45 to the gas flowing in the gas delivery duct 37, when one or more of the pressure control valves 39.1-39.n are open.

The system 1 described so far operates as follows. If the demand from low-pressure gas distribution network 5 is lower than the maximum flowrate that can flow through the expander 11, gas will flow only through pipeline 7 and expander 11, while the pressure control valves 39.1-39.n are closed. The gas expands in the expander 11 from the inlet pressure $P_{in}$ (or a slightly lower pressure, if the losses along pipeline 7 and heat exchanger 9 are taken into account) to the outlet pressure $P_{out}$, which shall be maintained around the pressure set point Ps. The pressure drop across expander 11 generates mechanical power, which is converted into electric power by the electric generator 15 and is available on the electric power distribution grid 17.

The gas exiting the expander 11 has an outlet temperature $T_{out}$, which must be maintained around the temperature set point Ts. To prevent the temperature of the expanded gas from dropping below the temperature set point Ts, heat Q provided by the transcritical heat pump 23 is transferred through the heat exchanger 9 to the gas flowing in pipeline 7. The heat Q exchanged in the heat exchanger 9 increases the gas temperature from a gas inlet temperature T1 at a gas inlet side of the heat exchanger 9, to a gas outlet temperature T2 at a gas outlet side of the heat exchanger 9. In the embodiment illustrated in FIG. 1, the heat exchanger 9 is a counter-flow heat exchanger. Therefore, the heat transfer fluid enters the heat exchanger 9 at the exit side of the gas at an inlet temperature T3 and exits the heat exchanger 9 at the gas inlet side at a temperature T4.

Figure 3:
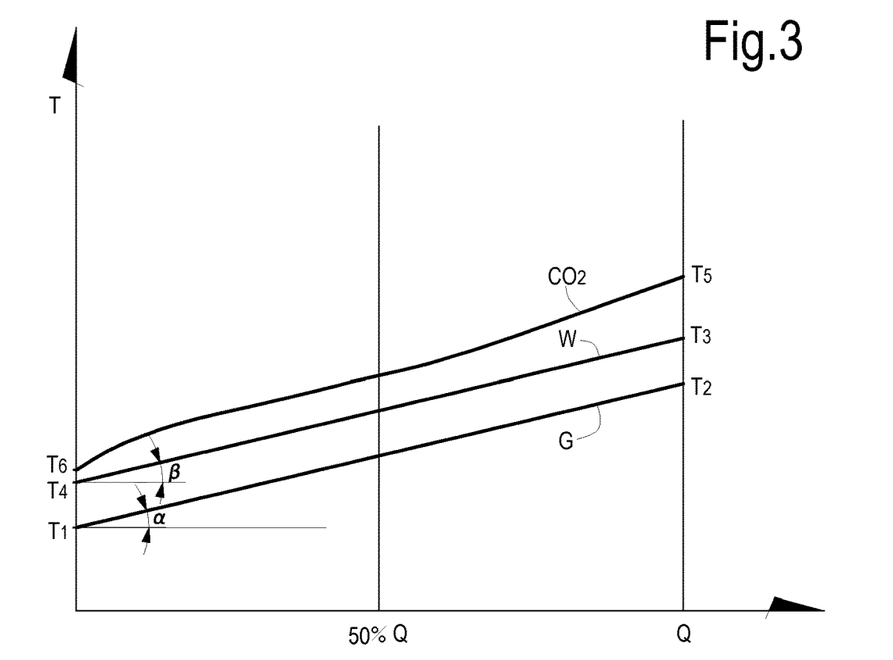
FIGS. 3, 4 and 5 illustrate heat transfer curves showing the heat transfer in the heat exchanger of the system of FIG. 1 in different operating conditions

FIG. 3 illustrates a heat-vs-temperature diagram showing the temperature of the two fluids on the vertical axis, versus the heat flow on the horizontal axis. The line W represents the temperature of the heat transfer fluid, e.g. water, and the line G represents the temperature of the gas. The line CO2 in FIG. 3 represents the temperature of the working fluid, e.g. carbon dioxide, in the transcritical heat pump 23. T5 and T6 are the inlet temperature and outlet temperature, respectively, of the working fluid in heat exchanger 29, where heat Q2 (FIG. 1) is exchanged by the working fluid of the transcritical heat pump 23 against the heat transfer fluid in the heat transfer circuit 19.

Figure 2:
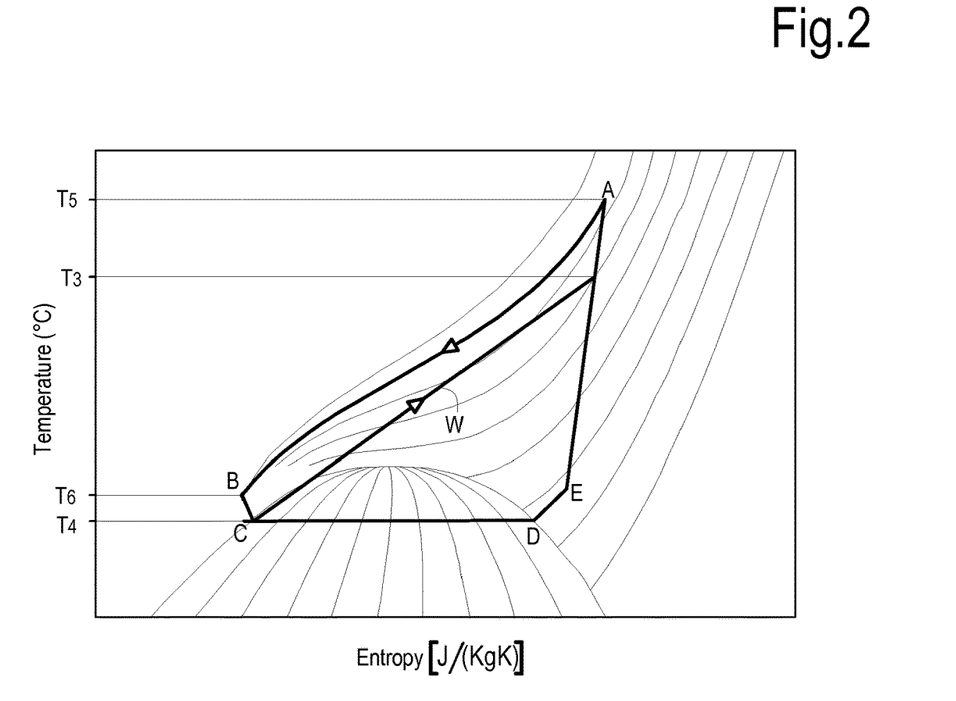
FIG. 2 illustrates a thermodynamic cycle of a transcritical heat pump in a temperature-entropy diagram.

FIG. 2 illustrates the thermodynamic cycle of the working fluid in the working fluid circuit 25 of the transcritical heat pump 23. High-temperature heat is rejected from the working fluid along an isobaric curve AB, along which the temperature of the working fluid drops from temperature T5 to temperature T6. Heat is transferred to the heat transfer fluid circulating in heat transfer circuit 19. The working fluid in this phase is in a supercritical state. After cooling, the working fluid is expanded in the expansion valve 31 (see curve BC in FIG. 2), reaching a lower temperature and lower pressure. The expanded fluid is heated by heat exchange in the heat exchanger 27, evaporates and can achieve a super-heated state (curve CDE in FIG. 2). Finally, compressor 33 compresses the working fluid (see curve EF in FIG. 2) until the required temperature T5 is achieved.

In the diagram of FIG. 2, the straight line W represents the temperature increase of the heat transfer fluid exchanging heat against the working fluid in the counter-flow heat exchanger 29.

The temperature T2 is set such that after expansion the gas temperature $T_{out}$ at the inlet of the low-pressure gas distribution network 5 is around the temperature set point Ts, e.g. 5° C. The amount of heat Q that shall be provided by the transcritical heat pump 23 to the gas depends upon the gas flow rate and the initial temperature T1 of the pressurized gas, which in turn depends upon the gas inlet temperature $T_{in}$. For a given gas flow rate through pipeline 7 and a given flow rate of the heat transfer fluid in the heat transfer circuit 19, the transcritical heat pump 23 provides the required amount of heat which ensures that the temperature $T_{out}$ is maintained around the temperature set point Ts.

In the diagram of FIG. 1 the references T1, T2, T3, T4, T5, T6, $T_{out}$ and $T_{in}$ represent the temperatures of the fluids in the respective points of the fluid circuits, and also schematically indicate temperature transducers for measuring said temperatures, if needed. Similarly, $P_{in}$ and $P_{out}$ indicate the respective pressure values and can indicate pressure transducers for detecting the pressure values.

As known, the Coefficient of Performance (COP) of the transcritical heat pump 23 is a function of the mean temperature between T5 and T6 and increases as said mean temperature decreases. As a matter of fact, since heat is "pumped" from a lower temperature heat source (e.g. ambient air) to a higher temperature heat sink (the heat exchanger 29), exploiting mechanical power to perform compression along curve DA of the thermodynamic cycle, it can well be understood that the lower the temperature rise required, the smaller the amount of mechanical power needed, and thus the higher the COP of the transcritical heat pump 23.

The transcritical heat pump 23 has an internal heat pump controller 23C, which sets the conditions in the working fluid circuit 25, such as to maximize the COP for a given temperature T5. Methods and algorithms have been developed by heat pump manufacturers for this purpose and are usually run by the heat pump controller 23C.

A change in the gas demand from the low-pressure gas distribution network 5 causes in turn a change in the outlet pressure. More specifically, if the gas demand increases, the pressure $P_{out}$ tends to drop. Conversely, if less gas is demanded from the low-pressure gas distribution network 5, the pressure $P_{out}$ tends to increase. To control the outlet pressure $P_{out}$ and maintain said pressure around the pressure set point Ps, a controller 51 is provided, which features a pressure control loop. A pressure transducer (schematically shown at $P_{out}$ in FIG. 1) can measure the actual value of the outlet pressure $P_{out}$. The measured outlet pressure value $P_{out}$ is compared by the controller 51 with the pressure set point Ps. The pressure control loop calculates the error between the measured value $P_{out}$ and the pressure set point Ps and generates a pressure error signal Ep. The pressure error signal Ep can be used to act upon the variable IGVs 11A of the expander 11, for instance through a suitable actuator that opens or closes the variable IGVs 11A depending upon the error signal Ep.

If the pressure $P_{out}$ tends to drop below the pressure set point Ps, the pressure error signal Ep causes opening of the variable IGVs 11A to increase gas flow rate through the expander 11. Conversely, if the pressure $P_{out}$ tends to rise above the pressure set point Ps, the pressure error signal Ep causes the variable IGVs 11A to partly close, thus reducing the gas flow rate.

Since the gas flow rate through the heat exchanger 9 changes, the gas temperature T2 at the expander inlet and consequently the gas outlet temperature $T_{out}$ also change. The temperature $T_{out}$ is further influenced by the efficiency of the expander 11, which is in turn dependent upon the gas flow rate.

A temperature control loop is featured by controller 51, for controlling the gas outlet temperature $T_{out}$, to counteract fluctuations thereof caused by a variation of the gas flow rate through the expander 11, such that the gas outlet temperature $T_{out}$ is maintained around the temperature set point Ts. The controller 51 receives information on the actual temperature $T_{out}$, e.g. by a suitable temperature transducer (represented in FIG. 1 by reference $T_{out}$) and generates a temperature error signal Et based on the measured $T_{out}$ and the gas temperature set point Ts. The temperature error signal Et is used as an input parameter for the controller 23C of the transcritical heat pump 23.

If the gas demand increases, a higher gas flowrate will be caused to flow through the expander 11, which in turn causes a drop of the temperature $T_{out}$. The temperature error signal Et requests additional power from the transcritical heat pump 23. Vice-versa, if the gas demand drops, less gas will flow through pipeline 7 and through the expander 11 and thus the temperature $T_{out}$ will raise. The controller 51 will thus generate a temperature error signal Et, which will inform the transcritical heat pump 23 that less duty (less heat power) is demanded. The transcritical heat pump 23 reacts to the temperature error signal Et by modifying the operating point of the transcritical heat pump 23. The control method applied by the controller 23C of the transcritical heat pump 23 can be any one of the methods used by heat pump manufacturers.

It has been discovered that, when the gas flow rate in pipeline 7 changes, if only the two control loops described so far are used, the temperatures T5 and T6 of the working fluid in the transcritical heat pump 23 and the inlet and outlet temperatures T1-T4 at the inlet and outlet sides of the heat exchanger 9 may move to a new set of values, which do not provide the maximum possible COP for the given operating condition of the system 1. This phenomenon can be best understood by referring to FIGS. 3, 4 and 5.

Figure 4:
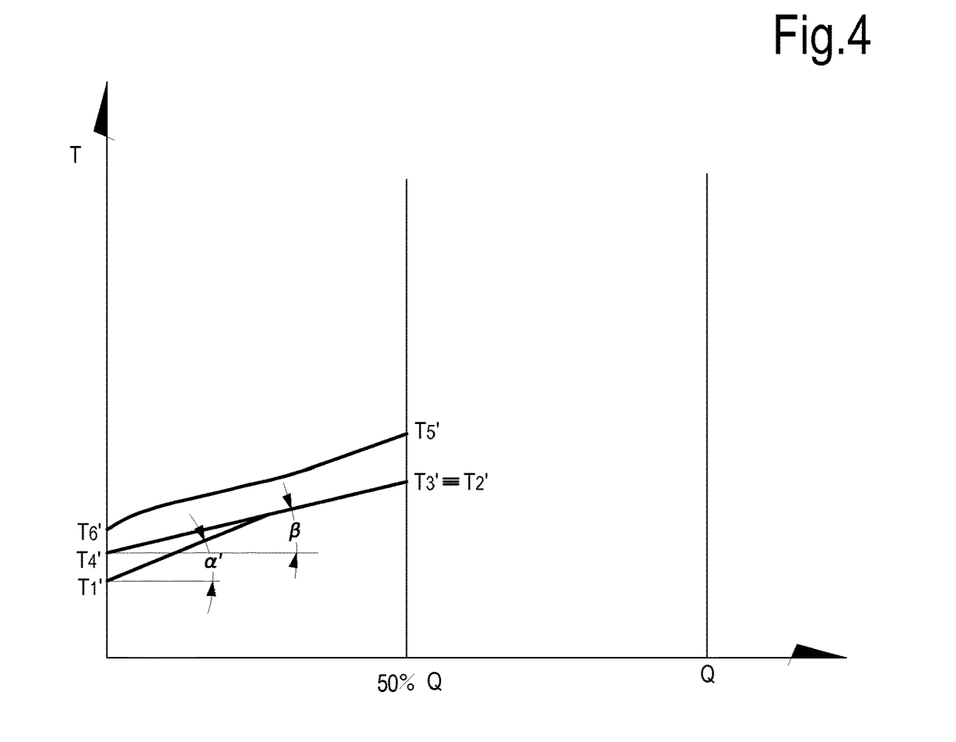
Figure 5:
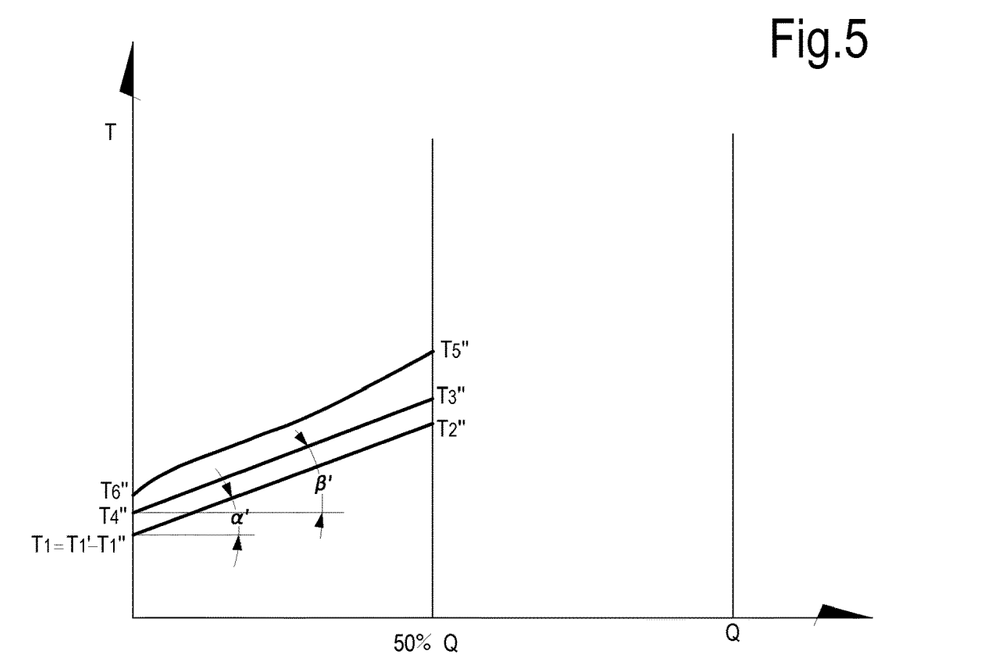

FIGS. 4 and 5 show the same curves CO2, W and G, as already described in connection with FIG. 3, but in a partial load condition, i.e. when the amount of heat to be provided to the gas flowing in pipeline 7 is around 50% of the heat required in the operating condition shown in FIG. 3 (full load). This can be due for instance to a drop in the gas demand from the low-pressure gas distribution network 5 and a consequent reduction of the gas flow rate through the expander 11. In FIG. 4 the flow rate of the heat transfer fluid in the heat transfer circuit 19 is identical to the flow rate in FIG. 3. In FIG. 5 a situation is depicted, wherein the same amount of heat as in FIG. 4 is transferred by the transcritical heat pump 23 to the gas in pipeline 7 through the heat transfer circuit 19, but using a different flow rate of the heat transfer fluid circulating therein.

Referring now to FIG. 4, the gas temperature at the inlet and outlet of the heat exchanger 9 are labeled T1' and T2', respectively. The inlet and outlet temperatures of the heat transfer fluid are labeled T3' and T4'. References T5' and T6' designate the temperatures of the working fluid of the transcritical heat pump 23 at the inlet and outlet of the heat exchanger 29, respectively. The operating condition of the transcritical heat pump 23 is controlled by the controller 23C such that the COP of the transcritical heat pump 23 is maximized under the conditions set by controller 51. The temperatures T5' and T6' and consequently the temperatures T3' and T4' are determined by the controller 23C, and are such that the gas temperature T2' ensures the gas outlet temperature $T_{out}$ remains around the temperature set point Ts.

The angle of inclination of the line G is proportional to $$\frac{1}{mg * cpg}$$

wherein:
mg is the mass flow of the gas
cpg is the specific heat capacity of the gas.
Similarly, the angle of inclination of the line W is proportional to $$\frac{1}{mw * cpw}$$

wherein:
mw is the mass flow of the heat transfer fluid
cpw is the specific heat capacity of the heat transfer fluid.
Since the mass flow of the gas through the heat exchanger 9 decreases from the condition depicted in FIG. 3 to the condition depicted in FIG. 4, the angle of inclination of the curve G increases from α in FIG. 3 to α' in FIG. 4. Temperature T1 in FIG. 4 remains the same as in FIG. 3, assuming that the gas temperature in the high-pressure gas transportation pipeline 3 remains constant. This assumption can be made since gas temperature changes in the pipeline 3 are much slower than changes in the gas flow rate through expander 11.

The angle of inclination β of the curve W remains the same in FIGS. 3 and 4, since it has been assumed that the flow rate of the heat transfer fluid in the heat transfer circuit 19 does not change when moving from the condition of FIG. 3 to the condition of FIG. 4.

FIG. 4 shows that the heat exchanger 9 is in actual fact over-sized, as evidenced by the difference between temperature of the gas and the temperature of the heat transfer fluid becoming zero at a certain point; i.e. only a portion of the total heat exchanger surface is actually exploited.

The same amount of heat (50% of Q) can be transferred from the heat transfer fluid to the gas flowing in pipeline 7 under a different operating condition of the heat transfer circuit 19, by changing the flow rate of the heat transfer fluid. FIG. 5 shows a situation where the same amount of heat as in FIG. 4 is delivered to the gas flowing in pipeline 7, using a lower flow rate of the heat transfer fluid in the heat transfer circuit 19. The change in the flow rate of the heat transfer fluid corresponds to a variation of the inclination β of the curve W. By reducing the flow rate of the heat transfer fluid with respect to the situation in FIGS. 3 and 4, the inclination of the curve W increases from β to β' in FIG. 5.

As can be noted by comparing FIGS. 4 and 5, when the flow rate in the heat transfer circuit 19 changes, also the inlet temperature T3" and the outlet temperature T4" of the heat transfer fluid as well as the corresponding temperatures T5" and T6" of the working fluid in the transcritical heat pump 23 change, and are set by the controller 23C at a value which provides the maximum COP for the new operating condition.

It can be understood by comparing FIGS. 4 and 5 that the mean temperature $$\frac{T5'' + T6''}{2}$$

is lower than the mean temperature $$\frac{T5' + T6'}{2}$$

Thus, in conclusion, the operating conditions of FIGS. 4 and 5 both meet the request from the temperature control loop and pressure control loop featured by controller 51, and both correspond to an operating point of the transcritical heat pump 23 which maximizes the COP thereof. However, by modifying the flow rate of the heat transfer fluid in the heat transfer circuit 19, two different COP can be achieved, the one corresponding to a lower flow rate of the heat transfer fluid being higher, since the mean temperature of the working fluid in the working fluid circuit of the transcritical heat pump 23 along line AB is lower.

The pressure control loop and the temperature control loop of controller 51 cause the operating point of system 1 to change in order to maintain the outlet temperature $T_{out}$ and the outlet pressure $P_{out}$ of the gas downstream of the expander 11 around the temperature set point Ts and the pressure set point Ps, respectively. More specifically, the pressure control loop modifies the gas flow rate through pipeline 7 and expander 11. The temperature control loop causes adjustment of the gas temperature T2 at the outlet of the heat exchanger 9. For a given flow rate of the heat transfer fluid in the heat transfer circuit 19, the gas temperature T2 can be achieved under a univocally determined operating condition of the transcritical heat pump 23, which provides the maximum COP, said univocally determined operating condition being set by the controller 23C of the transcritical heat pump 23.

The flow rate of the heat transfer fluid in the heat transfer circuit 19 is a further variable of the system, which can be acted upon to further optimize the COP of the transcritical heat pump 23.

A further control loop can thus be provided, which controls the flow rate of the heat transfer fluid in the heat transfer circuit 19, e.g. by changing the rotational speed of pump 21. This further control loop will be referred to herein as flowrate control loop. The flowrate control loop changes the flow rate of the heat transfer fluid in heat transfer circuit 19 to set the flow rate at an optimal value, which corresponds to an optimal maximum COP of the transcritical heat pump 23. The flowrate control circuit can provide a flowrate control signal Ef (see FIG. 1), which is applied to pump 21, for changing the flow rate of the heat transfer fluid until optimal COP conditions are achieved.

It has been discovered that optimal operating conditions for a given gas flow rate can be achieved if the curves G and W are parallel to one another, i.e. if:

$$\Delta Ta=(T3-T2)=(T4-T1)=\Delta Tb$$

The flowrate control loop can thus use gas temperatures and heat transfer fluid temperatures measured at the inlet and outlet of the heat exchanger 9 and execute an algorithm which, based on one of the two temperature differentials ΔTa, ΔTb and iteratively modifying the flow rate of the heat transfer fluid by acting upon pump 21, aims at equalizing the two temperature differential values. For instance, if $$\Delta Ta=(T3-T2)<(T4-T1)=\Delta Tb$$

the flowrate control signal Ef can reduce the flow rate, and vice-versa.

The above described flowrate control loop is particularly effective, since it is based on simple temperature measurements, which can be performed by temperature sensors, schematically shown in FIG. 1 at T1, T2, T3 and T4. The method does not require access to data from the transcritical heat pump 23 and does not require complex thermodynamic calculations. It also does not require any knowledge of information on the internal operation of the transcritical heat pump 23.

However, in currently embodiments, the flowrate control loop can be configured also in a different manner. For instance, the COP of the transcritical heat pump 23 can be calculated for a given set of operating parameters. The flowrate control loop can for instance be based on an iterative perturb-and-observe algorithm and cause stepwise variations of the flow rate of the heat transfer fluid in the heat transfer circuit 19. If the flow rate variation causes a drop of the COP, this means that an opposite variation is required and will be applied at the next iterative step. For instance, if an increase of the flow rate of the heat transfer fluid causes a drop of the COP, the next iterative step will decrease the flow rate, until the maximum COP is achieved for a given working point of the expander 11.

Conversely, if the flow rate variation imposed by an iterative step of the process results in an increase of the COP, the next iterative step will impose a flow rate variation in the same direction.

In the embodiment shown in FIG. 1 the expander 11 is dimensioned to support a gas flow rate which is only a fraction of the maximum flow rate, which can be delivered through the system 1. This takes into account the fact that a pressure-let-down system operates for most of the time under partial-load conditions. It would thus be ineffective to design the expander 11 and the transcritical heat pump 23 to support the maximum gas flow rate, which can be demanded by the low-pressure gas distribution network 5.

When the gas flow rate requested from the low-pressure gas distribution network 5 increases above the maximum flow rate capacity through the expander 11, i.e. when the pressure control loop has entirely opened the variable IGVs 11A of the expander 11, additional gas flow rate can be provided by selectively opening the valves 39.1-39.n of the pressure control valve arrangement 39. The pressure of the gas flowing through the pressure control valves 39.1-39.n drops by Joule-Thomson effect. One or more of the pressure control valves 39.1-39.n can be entirely opened, depending upon the flow rate requested from the low-pressure gas distribution network 5. One of the pressure control valves 39.1-39.n is partly opened and used for dynamically adapting the flow rate therethrough to meet the request from the low-pressure gas distribution network 5, maintaining the outlet gas pressure at the requested pressure set point Ps. The heater 41 is used to heat the gas flowing through the pressure control valve arrangement 39 such that the outlet gas temperature $T_{out}$ is maintained at the temperature set point Ts. Control of the pressure control valve arrangement 39 and of the heater 41 can be performed in a manner known per se by a controller separate from controller 51.

It shall be noted that the temperature $T_{out}$ is actually measured downstream of a point where the gas flowing through expander 11 mixes with the gas flowing through the pressure control valve arrangement 39, as shown in FIG. 1. What matters and shall be controlled is in fact the gas temperature at the outlet of the system 1, which depends upon the flow rates through the two gas flow paths 7 and 37.

While the disclosed embodiments of the subject matter described herein have been shown in the drawings and fully described above with particularity and detail in connection with several exemplary embodiments, it will be apparent to those of ordinary skill in the art that many modifications, changes, and omissions are possible without materially departing from the novel teachings, the principles and concepts set forth herein, and advantages of the subject matter recited in the appended claims.

For instance, the gas can be heated downstream of the expander 11 rather than upstream thereof, by arranging the heat exchanger 9 downstream of the expander 11 with respect to the direction of the gas flow F. The same holds true for the heater arrangement 41 and the pressure control valve arrangement 39 along the delivery path 37.

Hence, the proper scope of the disclosed innovations should be determined only by the broadest interpretation of the appended claims so as to encompass all such modifications, changes, and omissions. In addition, the order or sequence of any process or method steps may be varied or re-sequenced according to alternative embodiments.

What we claim is:

1. A system for depressurizing a gas in a pipeline, comprising:
    an expander configured and arranged to generate mechanical power by expanding gas from a first pressure to a second pressure, the first pressure being higher than the second pressure;
    a heat pump;
    a heat transfer circuit having a heat transfer fluid circulating therein to receive heat from the heat pump and deliver the heat to the gas through a heat exchanger;
    a controller configured to modulate a flow rate of the heat transfer fluid circulating in the heat transfer circuit as a function of a heat rate to be transferred from the heat transfer fluid to the gas, specifically as a function of temperature differentials between the gas and the heat transfer fluid at a gas inlet side and a gas outlet side of the heat exchanger;
    a gas delivery duct arranged in parallel to the expander and the heat exchanger;
    a pressure control valve arrangement comprising a plurality of pressure control valves arranged in parallel; and
    a heater,
    wherein the pressure control valve arrangement and the heater are arranged along the gas delivery duct and the heater is located upstream of the pressure control valve arrangement with respect to the gas flow direction in the gas delivery duct.

2. The system of claim 1, wherein the heat exchanger is arranged upstream of the expander with respect to a direction of flow of the gas in the pipeline.

3. The system of claim 1, wherein the heat pump is a transcritical heat pump.

4. The system of claim 1, wherein the controller is functionally connected to temperature sensors configured to measure gas and heat temperature fluid temperatures at an inlet and an outlet of the heat exchanger.

5. The system of claim 1, wherein the controller comprises a flowrate control loop to modulate the flow rate of the heat transfer fluid to minimize a difference between a first temperature differential between the gas and the heat transfer fluid at the a gas inlet side of the heat exchanger and a second temperature differential between the gas and the heat transfer fluid at the a gas outlet side of the heat exchanger.

6. The system of claim 5, wherein the flowrate control loop is configured to change the flow rate of the heat transfer fluid in the heat transfer circuit so to maximize the coefficient of performance (COP) of the heat pump.

7. The system of claim 1, wherein the controller features a temperature control loop arranged and configured for minimizing a difference between a gas temperature downstream of the expander and a gas temperature set point, by acting upon the heat rate from the heat transfer fluid to the gas.

8. The system of claim 1, wherein the controller features a pressure control loop arranged and configured for minimizing a difference be-tween a gas pressure downstream of the expander and a gas pressure set point, by acting upon the gas flow rate through the expander.

9. The system of claim 1, wherein the expander has variable inlet guide vanes, and wherein the controller is configured and arranged for adjusting a gas flow rate through the expander by acting upon the variable inlet guide vanes.

10. A method for depressurizing a gas in a pipeline, comprising the following steps:
    delivering a gas through a heat exchanger and an expander;
    heating the gas in the heat exchanger by delivering thereto heat from a heat pump through a heat transfer fluid circulating in a heat transfer circuit and in heat exchange relationship with the gas and with a working fluid processed by the heat pump;
    expanding the gas from a first pressure to a second pressure in the expander and generating mechanical power therewith; and
    modulating a flow rate of the heat transfer fluid in the heat transfer circuit to minimize a difference between a first temperature differential between the gas and the heat transfer fluid at a gas inlet side of the heat exchanger and a second temperature differential between the gas and the heat transfer fluid at a gas outlet side of the heat exchanger.

11. The method of claim 10, wherein the heat pump is a transcritical heat pump.

12. The method of claim 10, wherein the step of heating the gas in the heat exchanger is performed prior to the step of expanding the gas in the expander, and the heat exchanger is arranged upstream of the expander with respect to a gas flow direction.

13. The method of claim 10, comprising the step of modulating the flow rate of the heat transfer fluid as a function of temperature differentials between the gas and the heat transfer fluid at the gas inlet side and the gas outlet side of the heat exchanger.

14. The method of claim 10, comprising the step minimizing a difference between a gas temperature downstream of the expander and a gas temperature set point by acting upon the heat rate from the heat transfer fluid to the gas.

15. The method of claim 10, comprising the step of minimizing a difference between a gas pressure downstream of the expander and a gas pressure set point by acting upon the gas flow rate in the pipeline.

16. A system for depressurizing a gas in a pipeline, comprising:
    an expander configured and arranged for generating mechanical power by expanding gas from a first pressure to a second pressure, the first pressure being higher than the second pressure;
    a heat pump;
    a heat transfer circuit having a heat transfer fluid circulating therein to receive heat from the heat pump and deliver the heat to the gas through a heat exchanger; and
    a controller configured to modulate a flow rate of the heat transfer fluid circulating in the heat transfer circuit when a first temperature differential between the gas and the heat transfer fluid at a gas inlet side of the heat exchanger varies from a second temperature differential between the gas and the heat transfer fluid at a gas outlet side of the heat exchanger to minimize the difference between the first temperature differential and the second temperature differential.

\* \* \* \* \*